(12) United States Patent
Pfannenberg

(10) Patent No.: US 7,370,479 B2
(45) Date of Patent: May 13, 2008

(54) SWITCH CUPBOARD WITH A COOLING DEVICE WHICH IS SUBJECT TO A ROTATION AND COOLING DEVICE FOR THIS

(75) Inventor: Andreas Pfannenberg, Hamburg (DE)

(73) Assignee: Pfannenberg GmbH, Hamburg (DE)

( * ) Notice: Subject to any disclaimer, the term of this patent is extended or adjusted under 35 U.S.C. 154(b) by 0 days.

(21) Appl. No.: 11/601,572

(22) Filed: Nov. 17, 2006

(65) Prior Publication Data

US 2007/0119185 A1 May 31, 2007

(30) Foreign Application Priority Data

Nov. 23, 2005 (DE) ............ 20 2005 018 434 U
Apr. 19, 2006 (DE) ............ 20 2006 006 326 U

(51) Int. Cl.
*F25B 21/02* (2006.01)

(52) U.S. Cl. .................................. 62/3.2; 62/259.2

(58) Field of Classification Search .......... 62/3.2, 62/3.4, 259.2
See application file for complete search history.

(56) References Cited

U.S. PATENT DOCUMENTS 5,729,981 A * 3/1998 Markus et al. .......... 62/3.4
6,814,134 B1 11/2004 Pravda
2003/0029172 A1 * 2/2003 Suthoff .................... 62/3.1

FOREIGN PATENT DOCUMENTS

DE 196 09 687 9/1997
WO 01/77526 10/2001

* cited by examiner

*Primary Examiner*—Melvin Jones
(74) *Attorney, Agent, or Firm*—Friedrich Kueffner

(57) ABSTRACT

The switch cupboard for receiving electrical and electronical components and switching elements which is subject to a rotation and which has at least one cooling device (30) with a cold emitting device part (31) placed in its inner space (23) and with a heat emitting device part (32) which is situated outside the switch cupboard (20) and which is placed for example in the tower head (11) of a wind power station is configured in such a manner that a condensate ring (41) is placed as a shell-shaped collecting trough (40) in the area of the cold side (31a) of the cooling device (30) which is placed in a wall (22) of the switch cupboard (20), cold side which is situated in the inner space (23) of the switch cupboard (20), whereby the inner space (42) is connected with a hose (50) guided out of the inner space (23) of the switch cupboard (20) which is configured as a spiral hose (50a) in the area of the warm side (32a) of the cooling device (30) situated outside the switch cupboard (20), whereby the spirally configured section (50a) of the hose (50) is configured as a spiral (51) with a constant radius or as an opening spiral (52) and whereby the axles of the rotor shaft (15) and of the condensate ring (41) enclosing the cooling body are parallel.

16 Claims, 11 Drawing Sheets

SWITCH CUPBOARD WITH A COOLING DEVICE WHICH IS SUBJECT TO A ROTATION AND COOLING DEVICE FOR THIS

FIELD OF APPLICATION

This invention relates to a switch cupboard with a cooling device which is subject to a rotation and a cooling device for this according to the preambles of the claims 1 and 9.

PRIOR ART

One or several switch cupboards with electronic and electrical components and switching elements are placed in the tower heads of wind power stations, whereby these switch cupboards are equipped with cooling devices. The switch cupboards participate in the rotation of the turbine spindle so that occuring condensation water is distributed and sprayed in the inner space of the switch cupboard with the result that the electrical and electronic components susceptible to moisture can be disturbed in their function or destroyed.

The aim of this invention is to avoid the above mentioned disadvantages.

Aim, Solution, Advantage

The invention provides a switch cupboard with the characteristics indicated in claim 1 to achieve this aim.

Accordingly, the switch cupboard is configured in such a manner that a condensate ring is placed as shell-shaped collecting trough in the area of the cold side of the cooling device which is placed in a wall of the switch cupboard, cold side which is situated in the inner space of the rotating switch cupboard, whereby the inner space of the collecting trough is connected with a hose guided out of the inner space which is configured as a spiral hose in the area of the warm side of the cooling device situated outside the switch cupboard, whereby the spirally configured section of the hose is configured as a spiral with a constant radius or as an opening spiral and whereby the axles of the rotor shaft and of the condensate ring enclosing the cooling device are parallel.

Because of this configuration of construction, it is guaranteed that the condensation water accumulating in the switch cupboard is safely let off outwards, the condensate being namely accumulated in the condensate ring and let off outwards over the spiral hose, whereby the condensate ring participates in the rotation of the switch cupboard. The condensate ring for the condensation water is dimensioned such that a high uptake capacity is guaranteed. Since the cooling is further active, when the rotor blade is standing, condensation water also occurs in this operating status so that it is guaranteed even then that the occuring condensation water is let off. The spiral hose which lets off the condensation water out of the condensate ring is placed outside the switch cupboard around the heat emitting device part of the cooling device, whereby the hose can be configured as a rigid spiral. If the spiral of the hose has a constant radius, the cutoff of the condensation water is due to gravitation, whereas for a hose configuration with an opening spiral the drainage of the condensation water is due to centrifugal forces and gravitational forces. In the latter case, the hose has the shape of a spiral which corresponds approximately to the spiral of a clock spring.

Because of this configuration according to the invention, it is always guaranteed that the occuring condensation water is let off outwards and the inner space of the switch cupboard is thus maintained free of condensation water.

Further advantageous configurations of the invention are the subject of the subclaims 2 to 8.

In order to avoid that condensation water which is in the condensate ring can flow over the trough edge, the condensate ring is provided with an overflow protection, for example as a reduced trough edge section. The condensate ring is made of plastics or of another appropriate material and has a square or a circular shape, whereby other geometrical configurations can also be used.

The hose which lets off the condensation water outwards is configured as a spiral hose situated in a surface plane and guided around the heat emitting device part of the cooling device.

In order to guarantee the drainage of the condensation water, the axle of a preferably cylindrical cooling device is for example parallel to the axis of the turbine spindle. This being, the condensate ring encloses preferably concentrically the condensate producing cold cooling body of the cooling device. The sense of rotation of the switch cupboard is adapted respectively to the sense of rotation of the turbine spindle. The condensate ring has at least one, preferably two condensate hose connections.

Moreover, the invention relates to a cooling device for a switch cupboard which receives electrical and electronical components and switching elements and which is subject to a rotation as this is the case for example for switch cupboards with cooling devices in wind power stations. Accordingly, the cooling device is configured in such a manner that a condensate ring as a shell-shaped collecting trough for occuring condensation water is assigned to this cooling device with its cold side of the cooling device placed in a wall of the switch cupboard which is situated in the area of the inner space of the switch cupboard, collecting trough the inner space of which is connected with a hose guided out of the inner space of the switch cupboard which is configured as a spiral hose in the area of the warm side of the cooling device which is situated outside the switch cupboard, whereby the spirally configured section of the hose is configured as a spiral with a constant radius or as an opening spiral.

Further advantageous configurations of the cooling device are the subject of the subclaims.

Preferably, the cooling device is configured as a Peltier element. However differently configured cooling devices can be used as well.

The switch cupboard or the cooling device configured according to the invention can be used at any place where the switch cupboard or the cooling device is subject to rotations and where condensation water occurs.

SHORT DESCRIPTION OF THE DRAWINGS

The invention is represented in the drawings by means of embodiments.

DETAILED DESCRIPTION OF THE INVENTION AND BEST WAY FOR CARRYING OUT THE INVENTION

Figure 1:
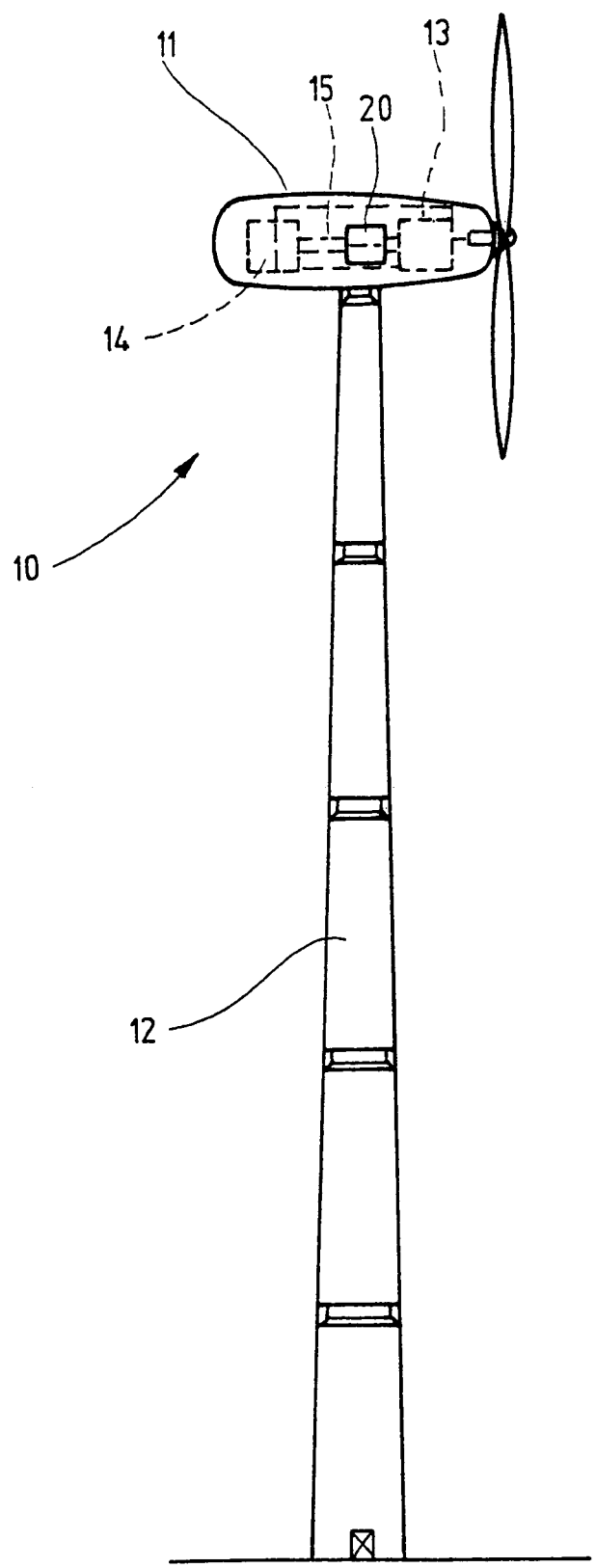
FIG. 1 shows a schematical side view of a wind power station with a switch cupboard with a cooling device.

FIG. 1 shows a wind power station 10 configured in a known manner which comprises a columnar tower 12, a tower head 11, a wind driven turbine 13 and an electrical generator 14 placed in the tower head, whereby the turbine 13 set into rotation by wind transmits the movement of rotation over a rotor shaft 15 or a gear to the electrical generator which transforms the rotation energy into electrical current. A switch cupboard 20 configured in a known manner which rotates about its own axle in direction of the arrow x (FIGS. 2 and 3) is placed in the rotation housing 16 placed in the tower head 11. The switch cupboard 20 receives the electrical and electronical components and switching elements and consists of a housing 21 with a cooling device 30 placed in its inner space 23 which is made of a cold emitting device part 31 which is situated in the inner space 23 of the switch cupboard housing 21. Furthermore, the cooling device comprises a heat emitting device part 32 which is situated outside the switch cupboard housing 21 (FIG. 4).

Figure 7:
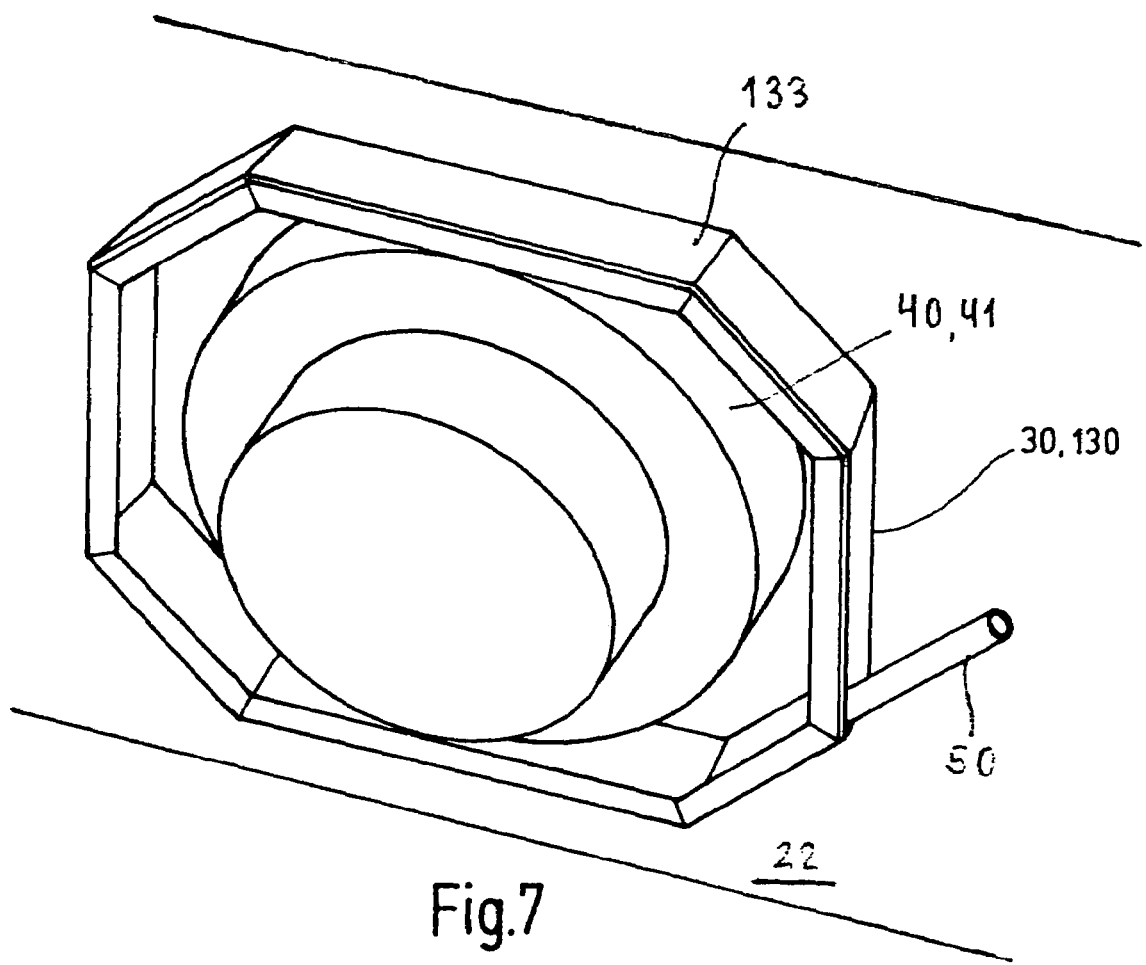
FIGS. 7 and 8 show graphical views of the housing which receives the hose spiral fixed on a switch cupboard.
Figure 10:
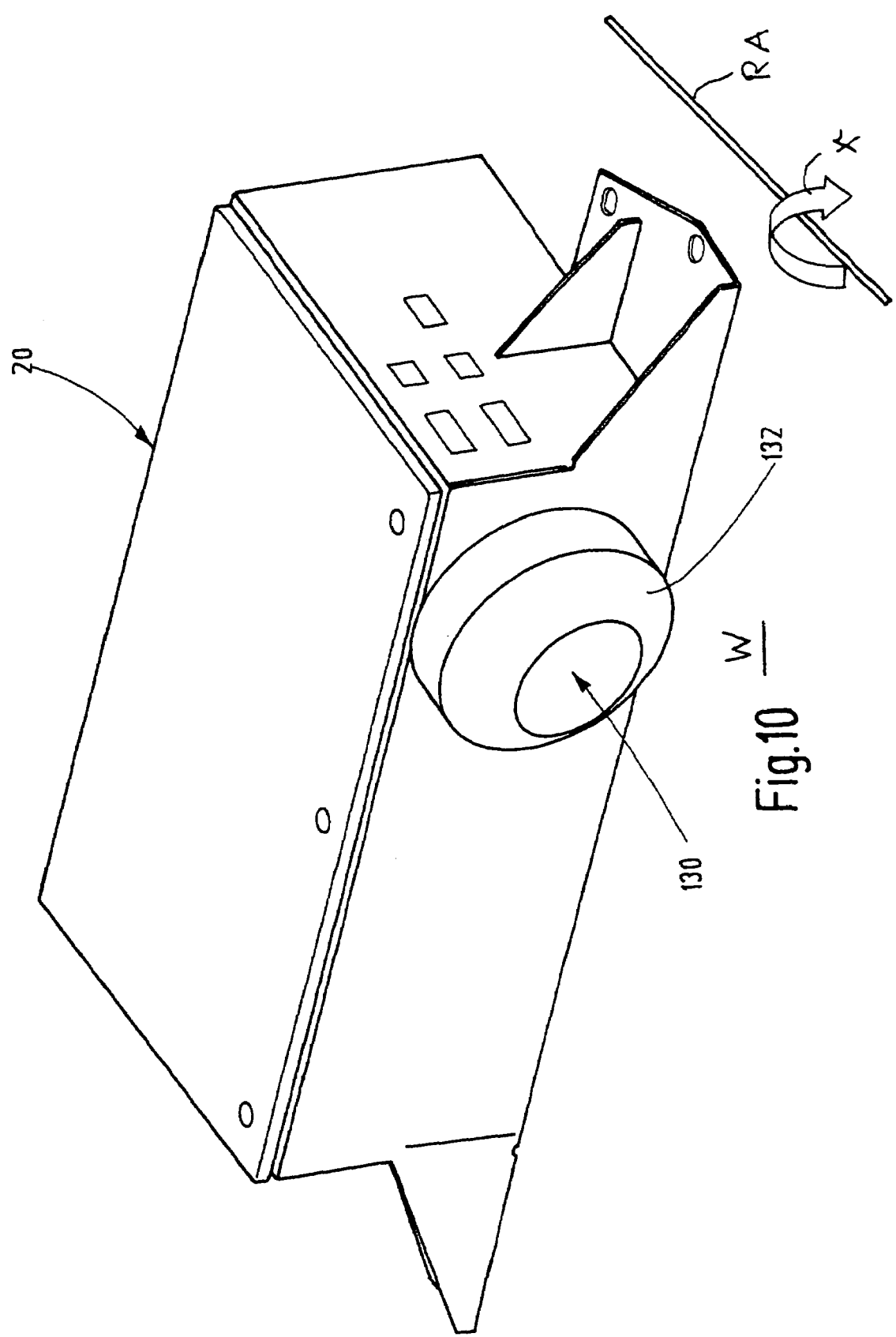
FIG. 10 shows a graphical view of the switch cupboard with a Peltier element.

For the embodiment described hereunder, the cooling device 30 is configured as a Peltier element 130 with the cold emitting device part 131 and the heat emitting device part 132. However, differently configured cooling devices can also be used. 133 designates the housing of the Peltier element 130 (FIGS. 7 and 10).

Condensation water which is to be removed from the inner space 23 of the housing 21 of the switch cupboard 20 is forming in the area of the cold emitting device part 31 of the cooling device 30.

Figure 4:
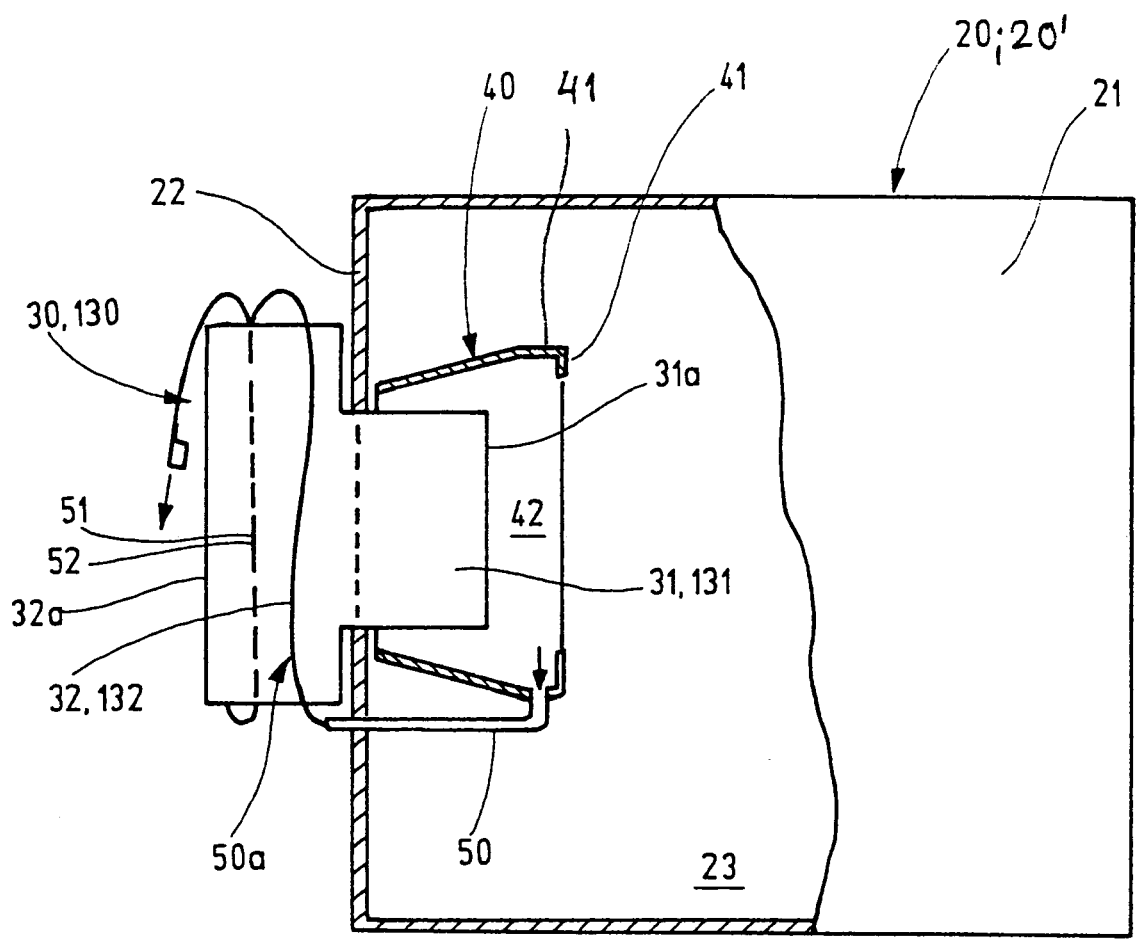
FIG. 4 shows partially as a view, partially in a vertical section, the switch cupboard with the cooling device and a condensation water drainage as a condensate ring with the function of a collecting trough and a spiral hose.
Figure 5:
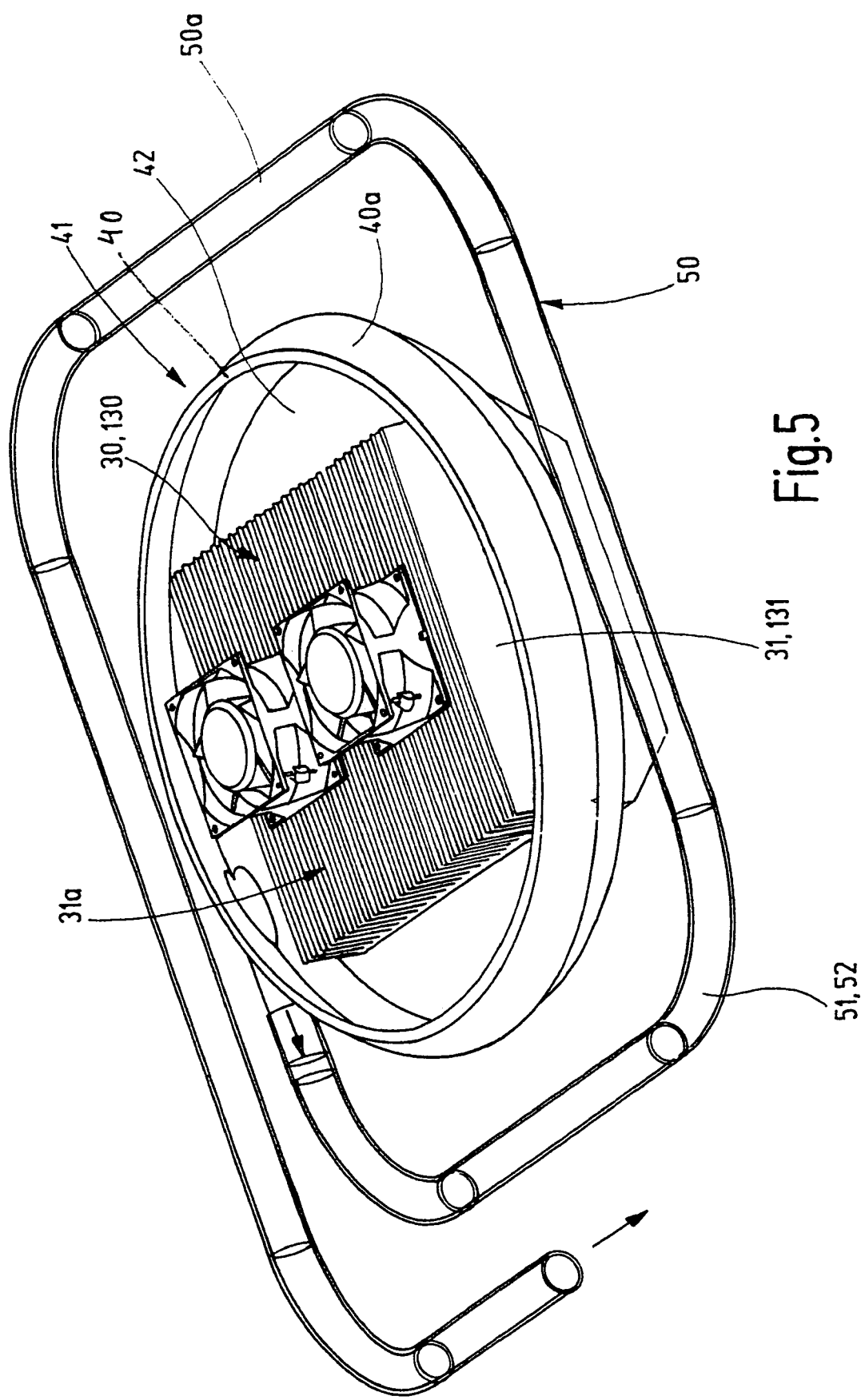
FIG. 5 shows a graphical view of the cooling device with the condensate ring for the condensation water and with the spiral hose.

A shell-shaped collecting trough 40 for occuring condensation water is provided for the condensation water drainage in the area of the cold side 31a of the cooling device 30 placed in the wall 22 of the switch cupboard 20, cold side which is situated in the inner space 23 of the switch cupboard 20 (FIG. 4). This condensate ring 41 is provided with an overflow protection, for example as a reduced trough edge section 40a (FIG. 5). Besides a circular configuration, the condensate ring 41 can also have another geometrical shape. The condensate ring 41 itself is made of plastics or of another appropriate preferably corrosion-proof material.

The arrangement of the condensate ring 41 in the inner space 23 of the housing 21 of the switch cupboard 20 is such that condensation water accumulating in the cold emitting device part 31 of the cooling device 30 is supplied to the condensate ring 41.

For the drainage of the condensation water out of the condensate ring 41, the inner space 42 thereof is connected with a hose 50 which is guided through the wall 22 of the housing 21 of the switch cupboard 20 outwards.

Figure 6:
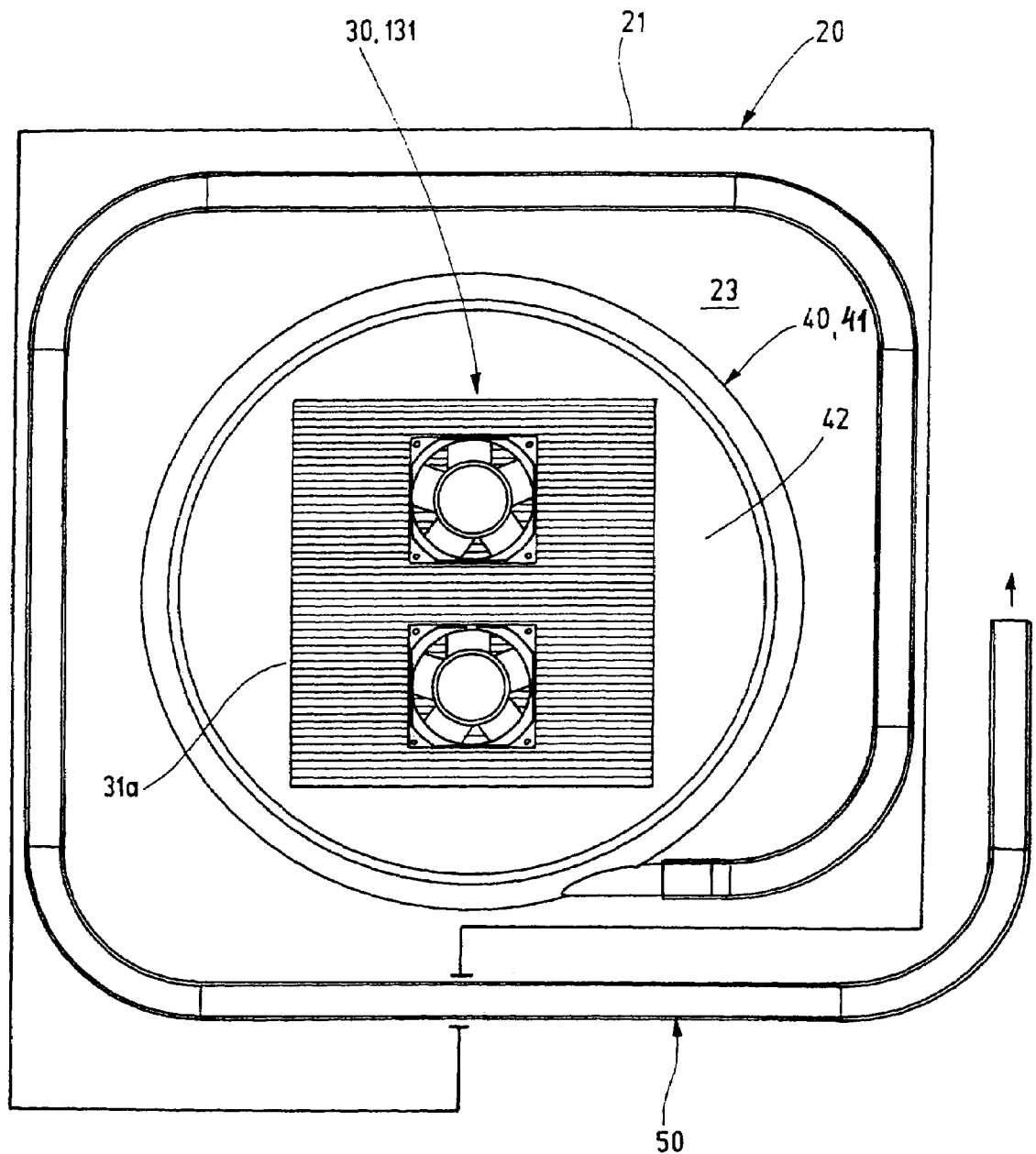
FIG. 6 shows a top view of the arrangement according to FIG. 5.

In order to be able to drain the condensation water out of the condensate ring 41 outwards in any position of the cooling device 30, the hose 50 is configured as a spiral hose. This. spiral-shaped hose section 50a can be configured as a spiral 51 with a constant radius or even as an opening spiral 52. Preferably the spiral-shaped hose section 50a of the hose 50 surrounds the outside situated and heat emitting device part 32 so that the condensation water escaping from the hose partially evaporates by the warm ambient air (FIG. 4, 5 and 6).

Figure 8:
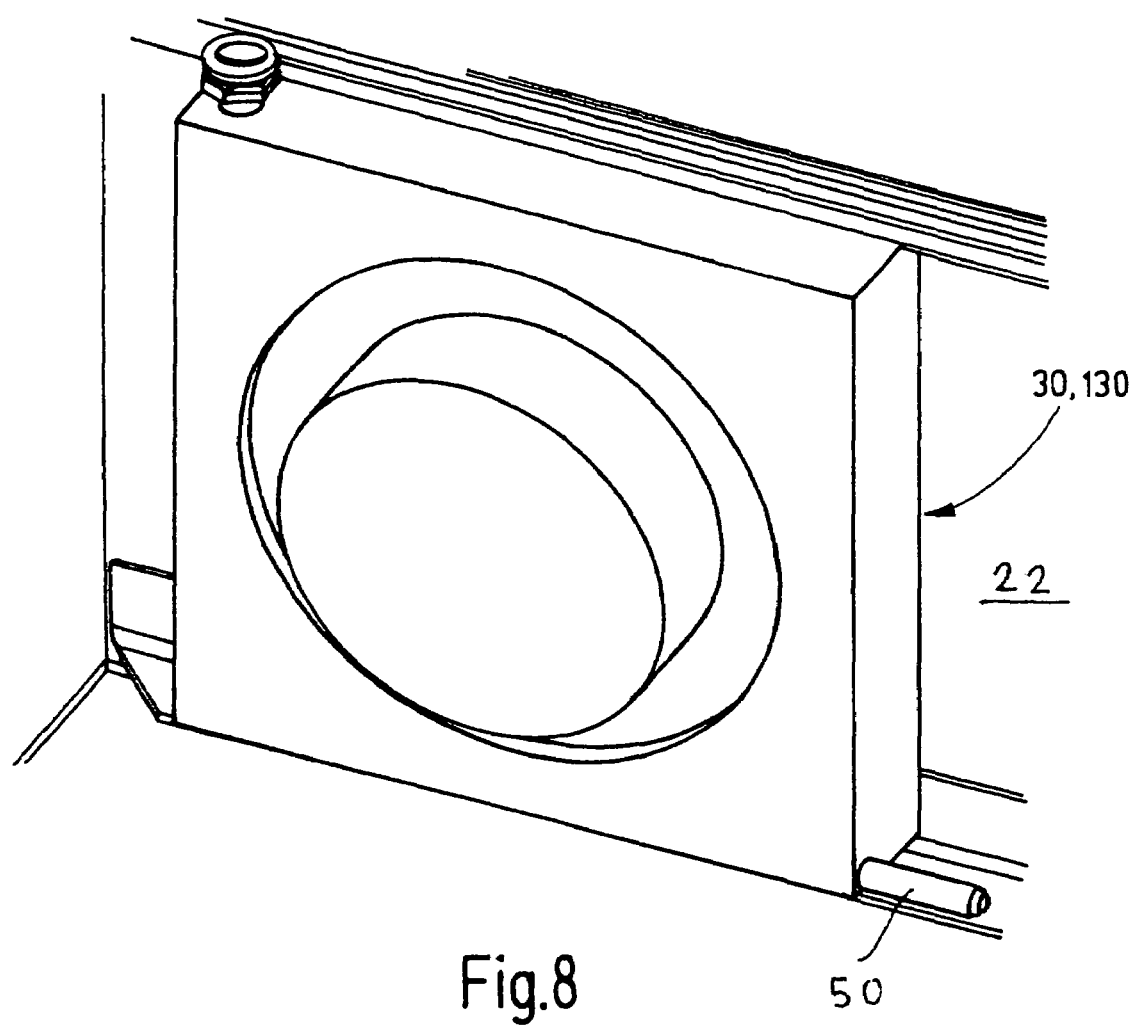
Figure 9:
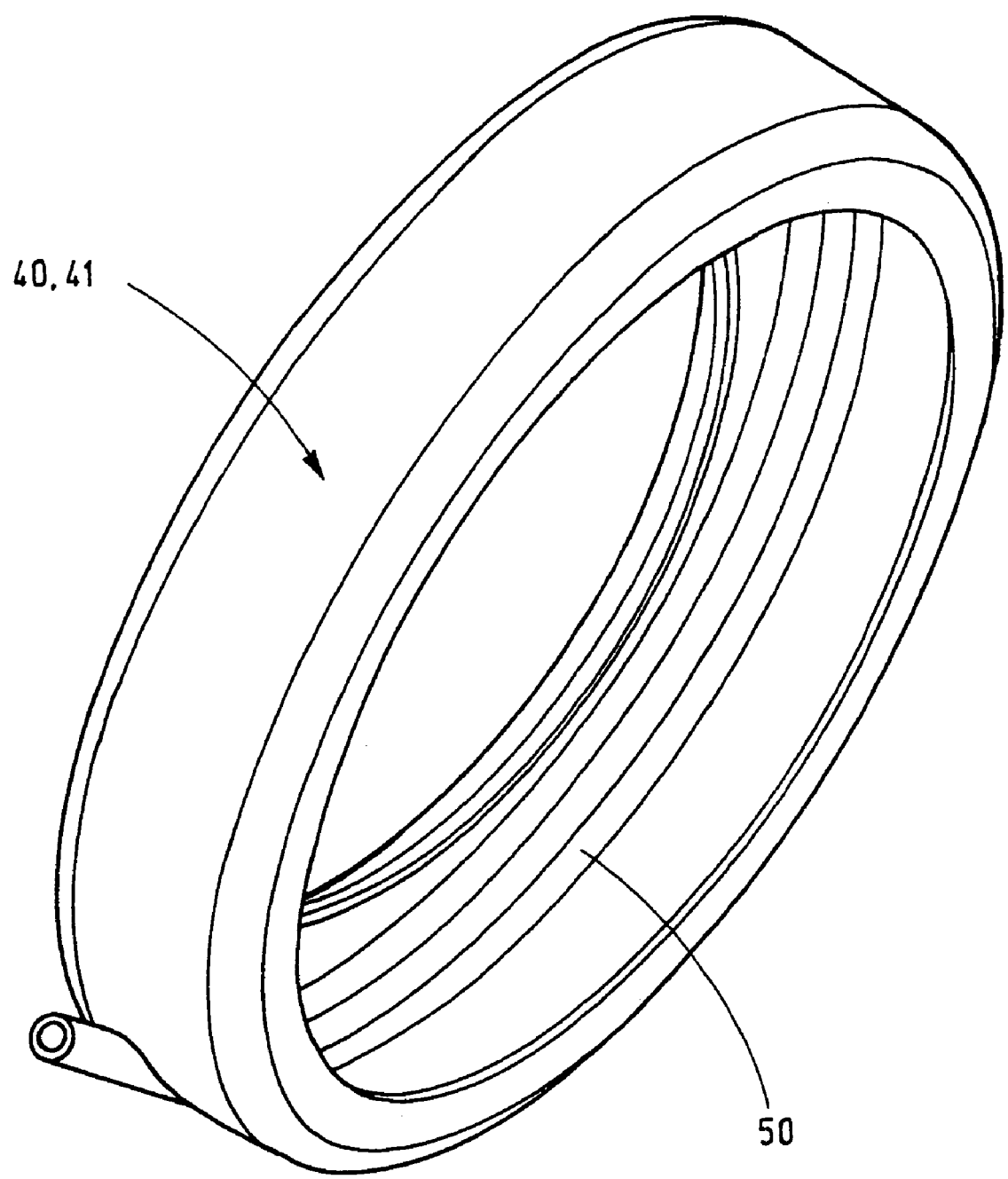
FIG. 9 shows a graphical view of the condensate ring.

The FIGS. 7 and 8 show graphical views of the housing which is fixed on the switch cupboard wall 22 and which receives the hose spiral.

With high rotating speeds, the drainage opening of the condensate ring 41 is to be arranged with the maximal distance measured from the rotor axle. The drainage of the condensate ring 41 takes place by centrifugal force radially to the axis of rotation of the switch cupboard 20.

Figure 2:
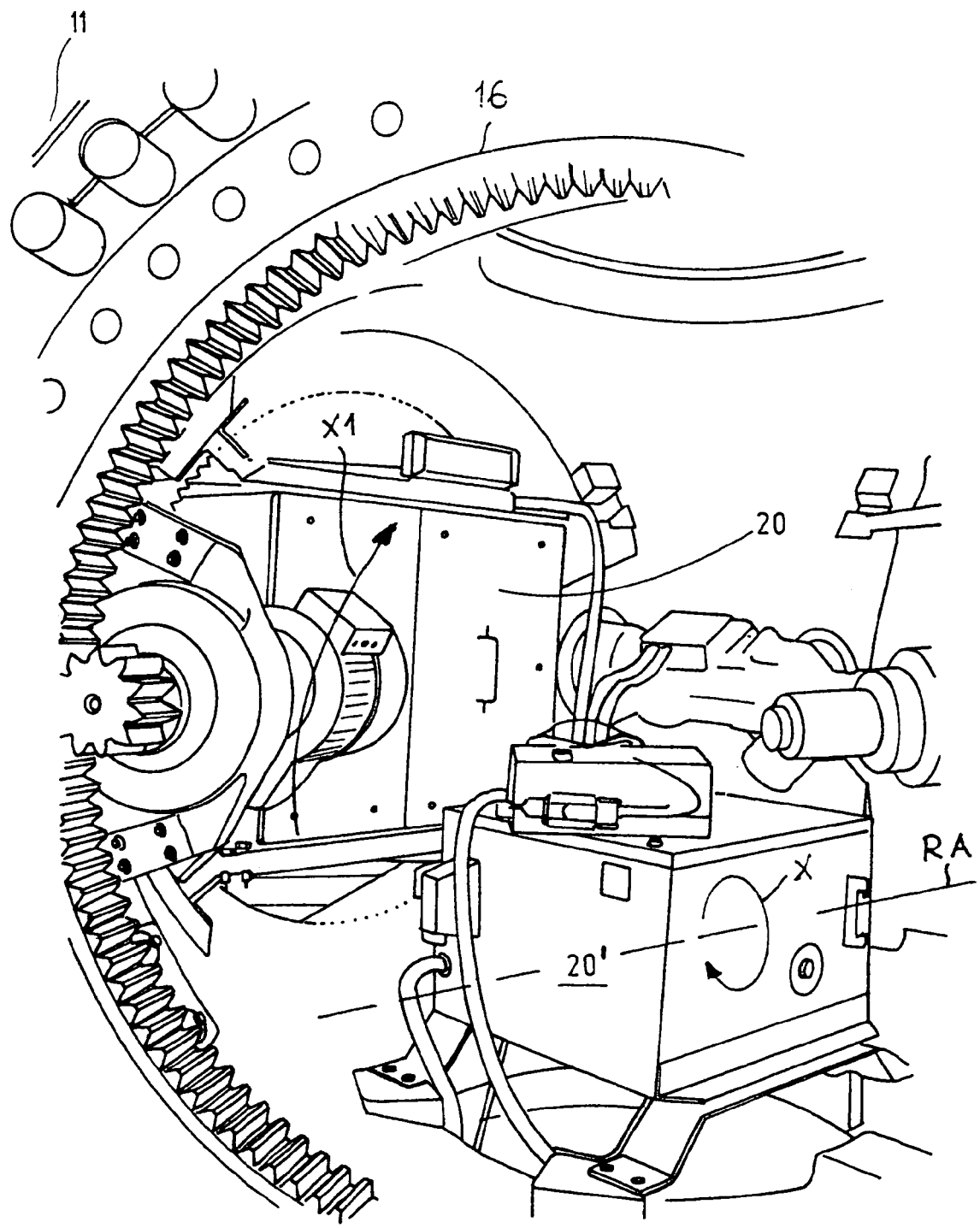
FIG. 2 shows a partial view in the inner space of the tower head of the wind power station with a switch cupboard placed in the inner space.
Figure 3:
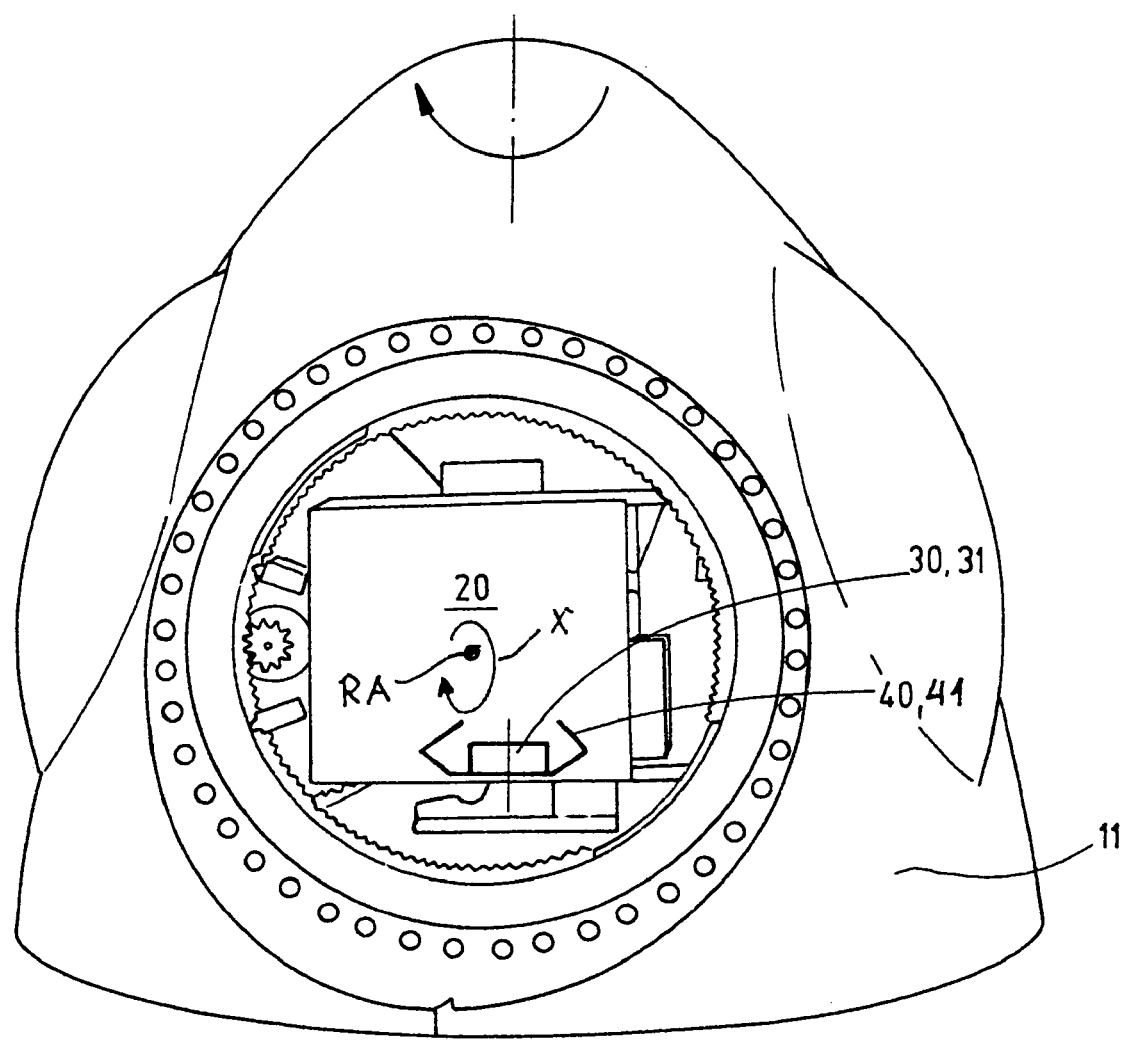
FIG. 3 shows a view of the opened tower head with a switch cupboard placed in the inner space.
Figure 11:
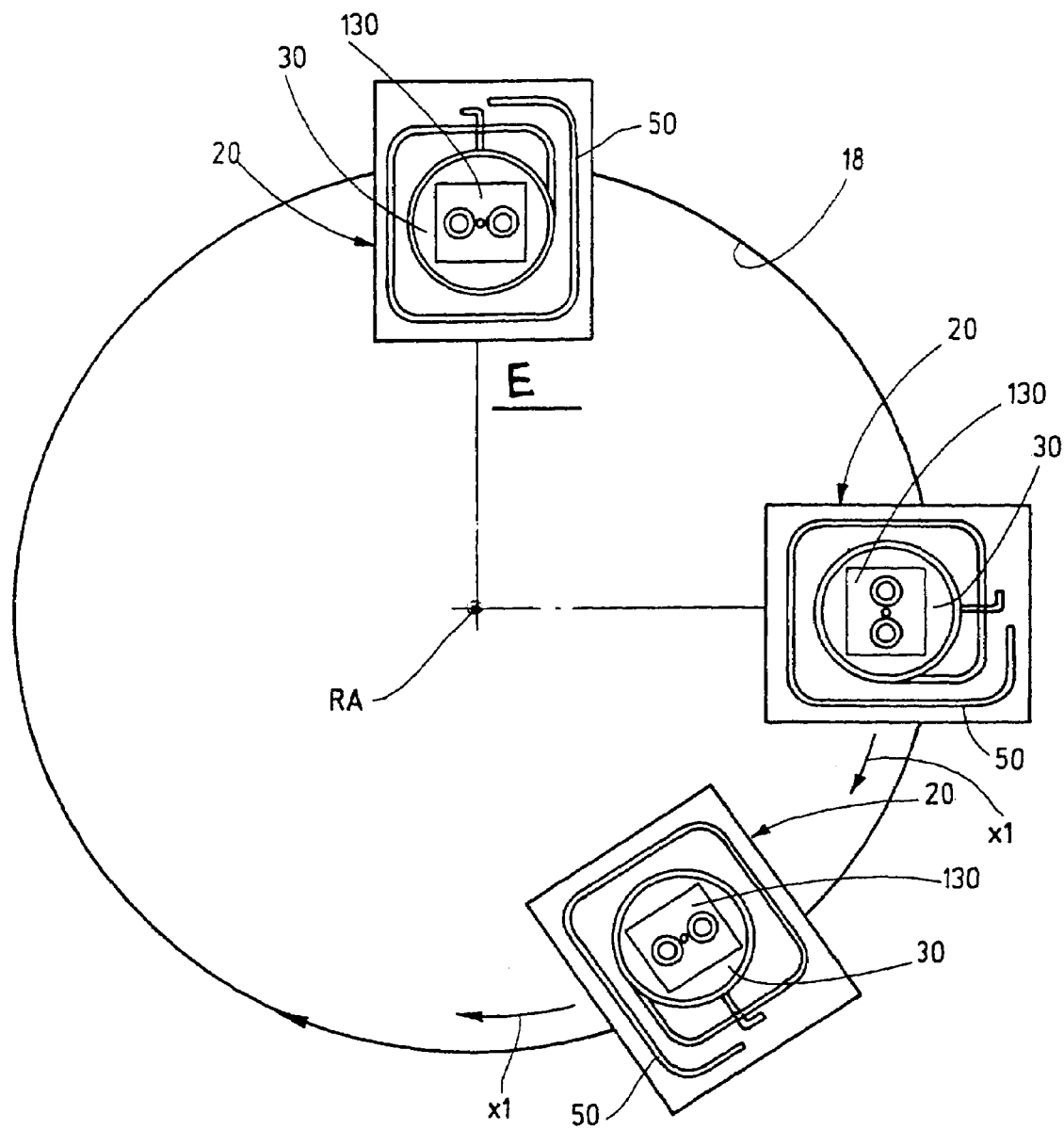
FIG. 11 shows a schematical view of the movement of rotation of the switch cupboard and of the cooling device.

Besides the switch cupboard 20 rotating about its own axle, a further switch cupboard 20' can be provided, as it is represented in FIG. 2. This switch cupboard 20' rotates about the rotor axle RA in direction of the arrow X1 (FIG. 1 and FIG. 11); it does not rotate about its own axle as the switch cupboard 20. The switch cupboard 20' also receives electrical and electronical components and switching elements and is also made of a housing with a cooling device 30 placed in its inner space, with a Peltier element 130 with the cold emitting device part 131 and the heat emitting device part 132.

Furthermore, the switch cupboard is also provided with the device described above for draining the condensation water. For high rotating speeds, an ejection of the condensation water takes plate at the utmost point since otherwise an accumulation of the condensation water is possible. Thus, the drainage takes place in the position E. The wall of the rotating cylinder is designated with 18 in FIG. 11. For a low speed rotation, the hose 50 opens because of its spiral-shaped configuration for a drainage of accumulated condensation water.

LIST OF REFERENCE NUMERALS

10 Wind power station
11 Tower head
12 Tower
13 Turbine
14 Generator
15 Rotor shaft
16 Rotation housing
18 Cylinder wall
20 Rotating switch cupboard
20' Switch cupboard
21 Housing
22 Wall
23 Inner space
30 Cooling device
130 Peltier element
131 Cold emitting device part
132 Heat emitting device part
133 Housing
31 Cold emitting device part
31a Cold side
32 Heat emitting device part
32a Warm side
40 Collecting trough
40a Reduced edge section
41 Condensate ring 42 Inner space
50 Hose
50a Spiral-shaped hose section
51 Spiral, constant radius
52 Opening spiral
RA Rotor axle
E Drainage position
W Warm area

The invention claimed is:

1. Switch cupboard for receiving electrical and electronical components and switching elements which is subject to a rotation and which has at least one cooling device (30) with a cold emitting device part (31) placed in its inner space (23) and with a heat emitting device part (32) which is situated outside the switch cupboard (20), whereby the cooling device (30) is preferably configured as a Peltier element (130), whereby the switch cupboard (20) is placed for example in the tower head (11) of a wind power station (10) which consists of a tower (12), the tower head 811), a wind driven turbine (13) and an electrical generator (14) placed in the tower head (11), whereby the turbine (13) set into rotation by wind transmits the movement of rotation over a rotor shaft (15) or a gear to the electrical generator which transforms the rotation energy into electrical current, wherein a condensate ring (41) is placed as a shell shaped collecting trough (40) in the area of the cold side (31a) of the cooling device (30) which is placed in a wall (22) of the switch cupboard (20), cold side which is situated in the inner space (23) of the switch cupboard (20), whereby the inner space (42) is connected with a hose (50) guided out of the inner space (23) of the switch cupboard (20) which is configured as a spiral hose (50a) in the area of the warm side (32a) of the cooling device (30) situated outside the switch cupboard (20), whereby the spirally configured section (50a) of the hose (50) is configured as a spiral (51) with a constant radius or as an opening spiral (52) and whereby the axles of the rotor shaft (15) and of the condensate ring (41) enclosing the cooling body are parallel.

2. Switch cupboard according to claim 1, wherein the condensate ring (41) for the condensation water is provided with an overflow protection, for example in shape of a reduced trough edge section (40a).

3. Switch cupboard according to claim 1, wherein the condensate ring (41) is made of plastics or of another appropriate material.

4. Switch cupboard according to claim 1, wherein the condensate ring (41) has a square or circular shape.

5. Switch cupboard according to claim 1, wherein the hose (50) is configured as a spiral hose (51) situated in a surface plane and guided around the heat emitting device part (32) of the cooling device (30).

6. Switch cupboard according to claim 1, wherein the hose (50) is configured as a spiral hose and opening and is guided around the heat emitting device part (32) of the cooling device (30).

7. Switch cupboard according to claim 1, wherein the axle of the condensate ring (41) enclosing the cooling part of the cooling device (30) is parallel to the axle of the rotor shaft (15).

8. Switch cupboard according to claim 1, wherein the sense of rotation of the switch cupboard (20) is adapted respectively to the sense of rotation of the rotor shaft (15).

9. Cooling device for a switch cupboard (20) for receiving electrical and electronical components and switching elements which is subject to a rotation, whereby the cooling device (30) has a cold emitting device part (31) placed in its inner space (23) and a heat emitting device part (32) which is situated outside the switch cupboard (20), whereby the cooling device (30) is preferably configured as a Peltier element (130) and whereby the switch cupboard (20) with the cooling device (30) is placed for example in the tower head (11) of a wind power station (10) which consists of a tower (12), the tower head (11), a wind driven turbine (13) and an electrical generator (14) placed in the tower head (11), whereby the turbine (13) set into rotation by wind transmits the movement of rotation over a rotor shaft (15) or a gear to the electrical generator which transforms the rotation energy into electrical current, wherein a condensate ring (41) as a shell shaped collecting trough (40) for occuring condensation water is assigned to the cooling device (30) with its cold side (31a) of the cooling device (30) placed in a wall (22) of the switch cupboard (20) which is situated in the area of the inner space (23) of the switch cupboard (20), collecting trough the inner space (42) of which is connected with a hose (50) guided out of the inner space (23) which is configured as a spiral hose (50a) in the area of the warm side (32a) of the cooling device (30) which is situated outside the switch cupboard (20), whereby the spirally configured section (50a) of the hose (50) is configured as a spiral (52) with a constant radius or as an opening spiral (52) and whereby the axles of the rotor shaft (15) and of the condensate ring (41) enclosing the cooling body are parallel.

10. Cooling device according to claim 9, wherein the condensate ring (41) for the condensation water is provided with an overflow protection, for example in form of a reduced trough rand section (40a).

11. Cooling device according to claim 9, wherein the condensate ring (41) is made of plastics or of another appropriate material.

12. Cooling device according to claim 9, wherein the condensate ring (41) has a square or circular shape.

13. Cooling device according to claim 9, wherein the hose (50) is configured as a spiral hose situated in a surface plane and is guided around the heat emitting device part (32) of the cooling device (30).

14. Cooling device according to claim 7, wherein the hose (50) is configured as a spiral hose and opening and is guided around the heat emitting device part (32) of the cooling device (30).

15. Cooling device according to claim 7, wherein the axle of the condensate ring (41) enclosing the cooling part of the cooling device (30) is parallel to the axle of the rotor shaft (15).

16. Cooling device according to claim 7, wherein the sense of rotation of the cooling device (30) is adapted respectively to the sense of rotation of the rotor shaft (15).

* * * * *